(12) United States Patent
Morykwas et al.

(10) Patent No.: US 7,379,393 B2
(45) Date of Patent: May 27, 2008

(54) TIMER DEVICE FOR USE IN AN AUDIO/VISUAL PRESENTATION

(76) Inventors: Michael Morykwas, 4011 Nathaniel Place Ct., Winston-Salem, NC (US) 27106; Phillip R. Merkey, 308 W. Jacker Ave., Houghton, MI (US) 49931

( * ) Notice: Subject to any disclaimer, the term of this patent is extended or adjusted under 35 U.S.C. 154(b) by 293 days.

(21) Appl. No.: 10/266,033

(22) Filed: Oct. 7, 2002

(65) Prior Publication Data

US 2004/0066709 A1 Apr. 8, 2004

(51) Int. Cl.
*G04B 47/00* (2006.01)
*G04B 19/00* (2006.01)
*G04C 19/00* (2006.01)
*G03B 21/00* (2006.01)

(52) U.S. Cl. .......................... 368/10; 368/79; 353/40; 353/122

(58) Field of Classification Search ................ 368/10, 368/79, 223, 278; 235/377; 353/40, 122, 353/DIG. 3; 359/436, 443, 449, 450
See application file for complete search history.

(56) References Cited

U.S. PATENT DOCUMENTS

| 813,836 | A | * | 2/1906 | Smith ........................ 368/79 |
| 2,726,571 | A | * | 12/1955 | Chang ........................ 368/79 |
| 4,944,578 | A | * | 7/1990 | Denison ....................... 349/6 |
| 5,136,397 | A | | 8/1992 | Miyashita |
| 5,247,492 | A | * | 9/1993 | Pan ............................ 368/79 |
| 5,260,919 | A | * | 11/1993 | Tsai ........................... 368/223 |
| 5,335,081 | A | | 8/1994 | Yamaguchi et al. |
| 5,574,843 | A | | 11/1996 | Gerlach, Jr. |
| 5,590,944 | A | * | 1/1997 | Stokes ........................ 353/122 |
| 5,592,676 | A | | 1/1997 | Bonnafoux |
| 5,627,978 | A | | 5/1997 | Altom et al. |
| 5,634,018 | A | | 5/1997 | Tani et al. |
| 5,666,554 | A | | 9/1997 | Tanaka |
| RE36,060 | E | | 1/1999 | Miyashita |
| 5,859,623 | A | | 1/1999 | Meyn et al. |
| 5,905,694 | A | | 5/1999 | Rothberg |

(Continued)

FOREIGN PATENT DOCUMENTS

DE 20019177 U 1/2001
EP 0694803 A * 1/1996

OTHER PUBLICATIONS www.dictionary.com, Dec. 28, 2004.*

(Continued)

*Primary Examiner*—Vit W Miska
(74) *Attorney, Agent, or Firm*—Kilpatrick Stockton LLP

(57) ABSTRACT

The present invention provides a time tracking device comprising a display incorporated into a housing of a projector, a control pad, and a power source. The time tracking device can provide a presenter with the ability to track the elapsed time of a presentation. The time tracking device is further capable of being projected onto a viewing screen using the light source and lens of the projector device. The device comprises a control pad which controls the functions of the timer device, such as on/off, start, stop, pause, reset, mode, illumination, and time of day. The present invention also provides a presentation timer comprising a presentation timer program module and an input control module operable for controlling timer functions associated with the presentation timer program module.

18 Claims, 3 Drawing Sheets

U.S. PATENT DOCUMENTS

| | | | |
|---|---|---|---|
| 5,905,988 | A | 5/1999 | Schwartz et al. |
| 6,008,807 | A | 12/1999 | Bretschneider et al. |
| 6,161,112 | A | 12/2000 | Cragun et al. |
| 6,175,343 | B1 | 1/2001 | Mitchell et al. |
| 6,220,512 | B1 * | 4/2001 | Cooper ................ 235/382 |
| 6,298,129 | B1 | 10/2001 | Culver et al. |
| 6,758,566 | B2 * | 7/2004 | Goulden et al. ............ 353/79 |
| 6,798,720 | B2 * | 9/2004 | Haupt et al. ............... 368/79 |

OTHER PUBLICATIONS http://www.microsoft.com/presspass/press/2001/feb01/02-28previewpr.asp.* http://office.microsoft.com/en-us/assistance/HA010565471033.aspx.* http://www.microsoft.com/presspass/press/2001/Mar01/03-05SupportPR.asp.*

IBM Corp., "Video Presentation Elapsed-Time Indicator", IBM Technical Disclosure Bulletin, Jun. 1, 1993, vol. 36, No. 6B, p. 217.

Sony Corp., "Character Display Device For Overhead Projector", Patent Abstracts of Japan, Mar. 31, 1997, vol. 1997, No. 03.

Sharp Corp., "Screen Projection System", Patent Abstracts of Japan, Jan. 30, 1998, vol. 1998, No. 01.

International Search Report for PCT/US02/32014 mailed Jun. 17, 2003.

* cited by examiner

TIMER DEVICE FOR USE IN AN AUDIO/VISUAL PRESENTATION

FIELD OF THE INVENTION

The present invention relates generally to the field of clocks and timers. More specifically, the present invention relates to a timing device disposed within a projector or within presentation software that aids a presenter and/or audiovisual personnel in tracking the elapsed time of a presentation.

BACKGROUND OF THE INVENTION

There are many conventional devices used for displaying information to an audience. Examples of an audience may include a group of students seated in a classroom, a group of business people at a conference, and participants connected to a conference via video conferencing equipment. Information presented to the students and other audiences, perhaps by a professor or a guest speaker, may be presented using a projector, such as an overhead projector or a slide projector. Information presented to an audience may also be presented using a personal computer, such as a laptop computer connected to a display projection device.

Conventional timing devices, such as clocks and stopwatches, are well known. In a typical classroom environment, there is typically a clock located on one of the classroom walls that displays the time of day. However, the clock typically does not possess stopwatch-type functions, and may not be in the same line of sight as the projector screen, making it inconvenient to look at the clock while maintaining focus on the subject matter of the presentation. Also, a presenter is not able to control the timing functions of a wall clock. There may be occasions during a presentation when it would be desirable for a speaker to have control of timing functions, such as during an experiment, an exam, or in tracking the total elapsed time of a presentation.

Video conferencing is typically a costly service. Displaying a timer to each conference participant would aid in the tracking of the total time of the video conference so as to make participants aware of the cost of the conference. Displaying the elapsed time of a video conference to all participants also aids in reminding the participants of how long they have been involved in a conference, in case they have a schedule to maintain. Since participants may become very involved in a conference and may lose track of the time, displaying the time to each participant on their individual screen is an effective way of providing a constant reminder.

A conventional time tracking approach is provided in U.S. Pat. No. 5,590,944, in which a portable electronic device having a transparent liquid crystal display is described. The timing device includes a plastic casing, foldable legs, and is placed onto the surface of a projector where light passes through the device and displays LCD numerals onto a screen. A disadvantage of the timer of the '944 patent is that it is not connected to a projector and may be easily lost, separated, or dropped from the projector surface. Since the device of the '944 patent is not integrated into the projector, it must also be supplied as a separate piece of equipment. Another disadvantage of the '944 timer is that it must be placed onto a flat, horizontal surface, such as that of an overhead projector. Many conventional projectors, such as a slide projector, do not possess a flat horizontal surface, making the conventional timer of the '944 patent impossible to use. An additional disadvantage of the '944 timer is that it interferes with the working space of an overhead projector surface, making it troublesome for a presenter to switch transparencies on the overhead projector without knocking the '944 timer out of place or even off of the projector surface onto the floor, where it may be become damaged.

A second timer approach is provided in U.S. Pat. No. 5,905,694, in which a timing device for coordinating a presentation includes a master timer with a timing initiator, a programmable master sensory alarm responsive to the sequencer, a master alarm silencer, and a communication transmitter responsive to at least one of the timing initiator and the master sequencer. The device of the '694 patent involves a low power radio signal transmitted by the communication transmitter. The timing device of the '694 patent is used for coordinating the timing of a presentation, but does not include a time display that may be displayed to the audience. The device involves sending a signal from a master controller to a slave timer that alerts a speaker of a time limit.

It is further desirable to have a device that allows a presenter of an audio/visual presentation to track the elapsed time of a presentation. It is also desirable to provide a time tracking device in which the presenter can start, stop, and pause the time tracking device in a simple manner, without taking time away from a presentation. Preferably, such a device would be included within a projector device, thus eliminating the need for a presenter to supply such a device for a presentation. It is also preferable that the time displayed on the timing device be capable of being projected by a projector to the viewing audience in an easy to read and interference free manner.

SUMMARY OF THE INVENTION

In one embodiment, the present invention provides a time tracking device disposed within a projector for the purpose of tracking presentation time and displaying the presentation time to an audience. The time tracking device may be disposed within any type of projector device, examples of which may include an overhead projector, as is often used in an educational classroom environment, a slide projector, a projector operably connected to a laptop computer, or any other type of projector device. The time tracking device may include features such as start, stop, pause, reset, etc. The present invention solves the problems associated with the conventional time tracking devices described above by providing a time tracking device that is incorporated into the projector housing, eliminating the need for a time tracking device to be supplied by a presenter. The device of the present invention may be operated by a presenter and/or by audiovisual personnel. The present invention also provides an easy to use device that does not interfere with the use of its associated projector.

The time tracking device of the present invention may include keys operable for controlling the functions of the device, such as a start key, a stop key, a reset key, a pause key, an on/off key, a display key, a mode key, or any other additional key that may be assigned a specific function. The time tracking device further includes a timer display, either analog or digital, that may be displayed to an audience via the projector light source and projector lens. In an alternative embodiment, the display may be displayed only to the presenter. The time tracking device display may include a liquid crystal display or any other type of display capable of being projected onto a screen viewed by the audience.

In a further embodiment, the time tracking device may be incorporated into the presentation hardware of a projector. In one example, the functions of the time tracking module may be controlled using the remote control unit associated with a projector device.

The time tracking device of the present invention eliminates the need for a presenter to supply his/her own time tracking device.

The time tracking device has a low power requirement which may be satisfied by solar panels, a battery, a connection to the circuitry of the associated projector, or a combination of any of the preceding.

Additional objects, advantages, and novel features of the invention will be set forth in part in the description which follows, and in part will become more apparent to those skilled in the art upon examination of the following, or may be learned by practice of the invention.

DETAILED DESCRIPTION OF THE INVENTION

Detailed embodiments of the present invention are disclosed herein, however, it is to be understood that the disclosed embodiments are merely exemplary of the invention that may be embodied in alternative forms. Specific structural and functional details disclosed herein are not to be interpreted as limiting, but merely as a representative basis for teaching one skilled in the art to variously employ the present invention.

Figure 1:
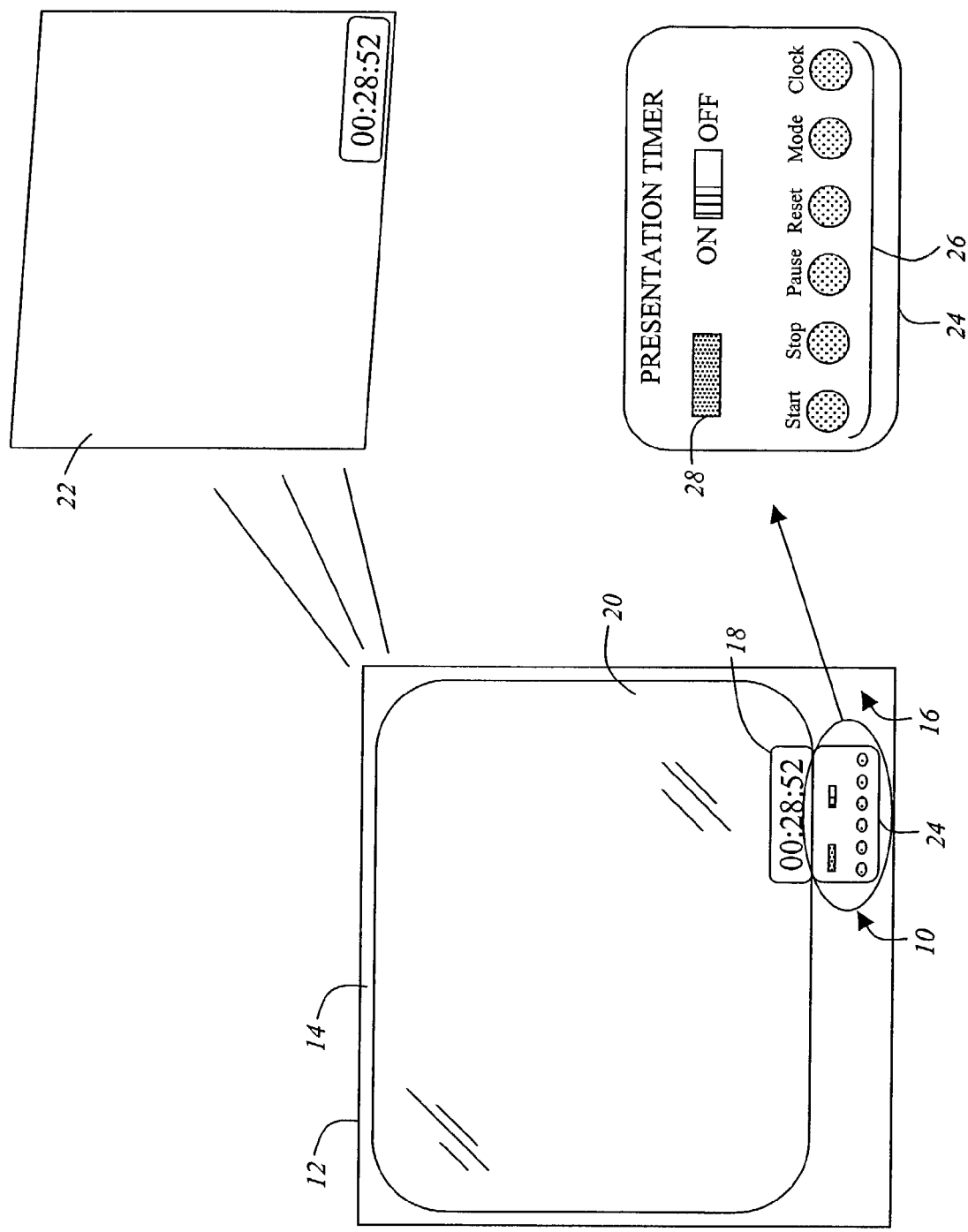
FIG. 1 is a diagram illustrating a time tracking device incorporated into an overhead projector in accordance with an exemplary embodiment of the present invention.

Referring now to the drawings, in which like numerals indicate like elements throughout the several figures, FIG. 1 is a diagram illustrating one embodiment of the time tracking device 10 of the present invention disposed within an overhead projector 12. The time tracking device 10 may be disposed within the projector housing 14, preferably within one corner of the housing surface 16, so as not to interfere with the bulk of the usable space of the housing surface 16. In alternative embodiments, the time tracking device 10 may be disposed within any other portion of the projector housing 14.

The device display 18 may consist of an analog or a digital display. The display 18 is incorporated into the light stage 20 of the housing surface 16. The device display 18 is transparent, such that the light source from within the overhead projector 12 can pass light through the device display 18 and project the analog or digital display of the timer readout onto the screen 22. The display may consist of a liquid crystal display (LCD) providing adequate visibility to the presenter and the audience. The presentation timer control pad 24 may be disposed within the opaque portion of the projector surface 16, such that light does not pass through the timer control pad 24. The positioning of the timer control pad 24 separates the heat sensitive components of the time tracking device 10 from the heat generated by the projector light source. In one embodiment, the timer control pad 24 may include light emitting diodes in the function keys 26 so that a presenter can easily see the function keys 26 in a darkened room.

The timer control pad 24 consists of a plurality of function keys 26. The function keys 26 allow a presenter and/or AV personnel to control the functions of the timer, including turning the timer on/off, starting, stopping, pausing, resetting, stopwatch, turning the display on/off, selecting various timer modes, etc. The various timer modes include displaying the elapsed time of a presentation, a countdown of the time remaining, displaying any one of the hours, minutes, seconds, displaying the time of day, etc. The function keys 26 may consist of any of several well-known types of switches, such as pushbutton switches, toggle switches, etc. The function keys 26 illustrated consist of pushbutton switches. It is preferable to have switches that lie flush with the housing surface 16 so as not to interfere with any papers or transparencies placed on the housing surface 16, or interfere with the workspace of the projector 12. It is also preferable to have a device display 18 that lies flush with the light stage 20 so that the device display 18 does not interfere with the working surface of the projector 12.

The time tracking device 10 has a low power requirement. In one embodiment, the time tracking device 10 may be connected to the circuitry of the projector 12. In a second embodiment, the device 10 is equipped with a solar panel 28 on its surface. The solar panel 28 may be located on the device display 18, or on the control pad 24. Positioning the solar panel on the device display 18 exposes the solar panels 28 to more light due to the light source of the projector 12 emitting light directly onto the solar panel 28 surfaces. Because of the lower power requirement of the time tracking device 10 it is not necessary that the solar panels 28 be located on the display portion. Light from the room during periods when the room is not darkened may power the timer device 10 and all of its associated functions. In a third embodiment, the time tracking device 10 may be powered using a battery. The solar panels 28, battery, and projector power source may all be used alone or in combination to power the time tracking device 10.

The time tracking device 10 may be cooled using the cooling mechanism of the projector 12, typically a fan motor. The light source of a projector typically produces heat which can easily damage the components of the time tracking device 10. The fan motor assembly forces air over the light source and other internal components of the projector in order to maintain optimal operating temperatures and prevent overheating. Solar panels 28, batteries, and LCD displays are all sensitive to heat exposure. The fan motor also cools the projector surface 16, particularly the light stage 20. The timer control pad 24 is exposed to a lesser amount of heat because it is disposed within the opaque portions of the housing 14, as compared to the light stage 20 in which the device display 18 is located.

Figure 2:
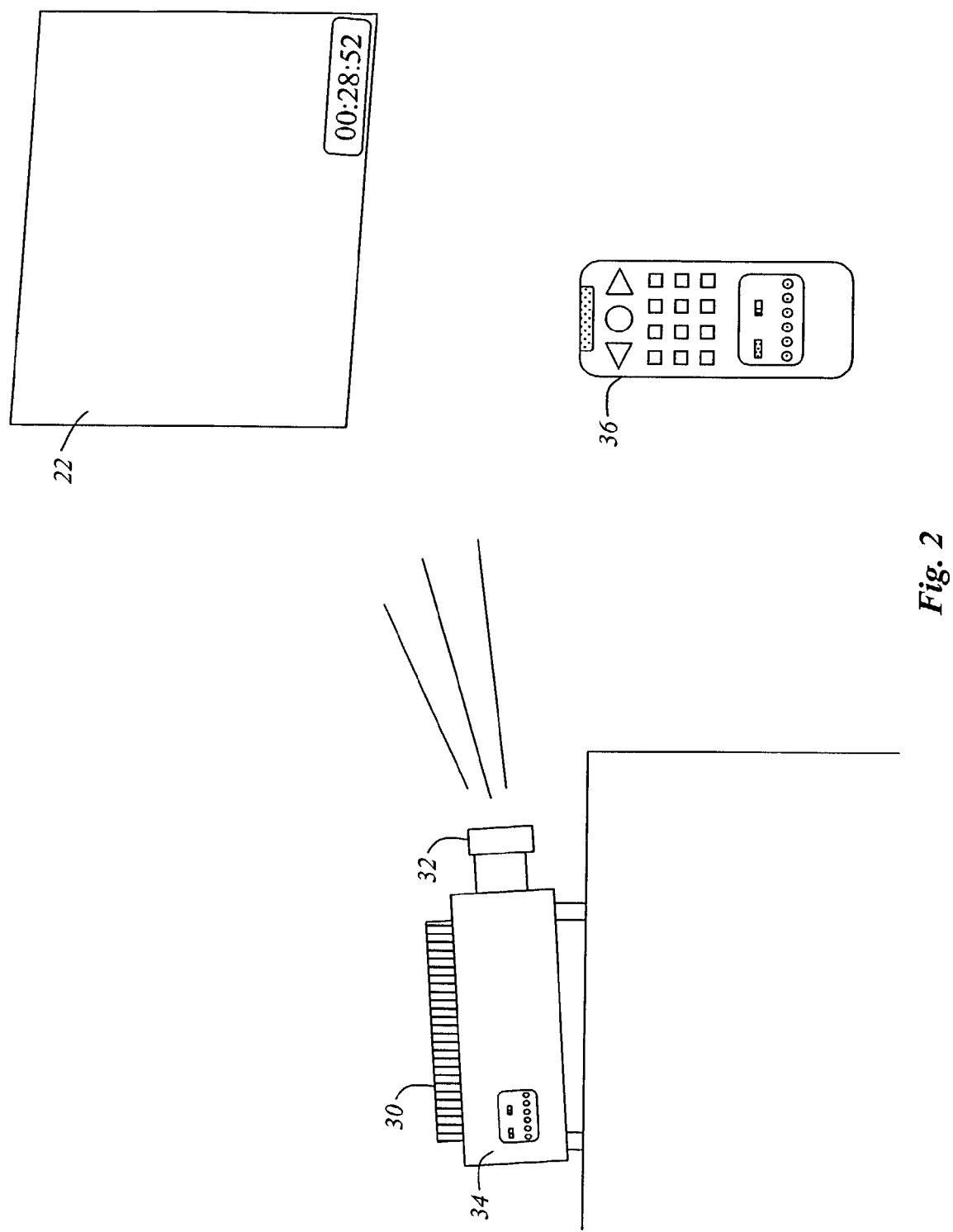
FIG. 2 is a diagram illustrating the time tracking device of FIG. 1 incorporated into a slide projector in accordance with an exemplary embodiment of the present invention.

Referring to FIG. 2, the time tracking device of the present invention may be incorporated into a slide projector 30. The location of the timer control pad 24 and the device display 18 of the time tracking device 10 may be similar to that of the overhead projector 12. The timer readout is displayed to the audience via the lens 32 of the slide projector 30. Slide projectors typically include a remote control unit 36 operable for controlling the functions of the projector 30. In one embodiment, the function keys 26 may be located on the slide projector housing 34. In an alternative embodiment, the function keys 26 may be located on the remote control unit 36, making the functions of the slide projector 30 and the time tracking device 10 controllable using the remote control unit 36 alone. The timer control pad 24 may be connected to the circuitry of the remote control unit 36, providing power and a remote connection to the projector 30 and the display 18.

As stated above, the time tracking device 10 may be controlled by a presenter and/or AV personnel. The timer readout is projected to the audience using the light source and lens of the projection device. The function keys 26 include a "display" function key that is operable for turning the display on or off. Turning the display "on/off" provides a presenter the option of being the only person able to view the timer readout. This may be useful in an exam situation in which a timer may be a distraction to test takers. In other situations, it may be desirable to display the timer readout to the audience as well as the presenter, such as during an exam in which the audience is allowed to a view a slide for a predetermined amount of time, then the projector moves onto the next slide and the timer resets and a new countdown begins.

In one embodiment, the time tracking device 10 may consist of a programmable microcomputer in which a presenter can program the timer to reset each time a new slide is selected, avoiding the need to manually reset and restart the timer for every new slide. The timer tracking device may also include a memory, which is well known in the art.

An audible, visual, and combination alarm may be a component of the control pad portion of the time tracking device 10. An alarm may be used to cue a presenter that a certain amount of time has elapsed. In one example, students could be taking a timed exam from transparencies placed onto an overhead projector. When the exam begins, the time tracking device 10 is activated and a countdown of thirty minutes begins. The timer readout is projected onto the screen and appears in the lower left hand corner of the screen, large enough to be visible by the audience, but not large enough to distract the audience from the subject matter of the transparencies. When five minutes is remaining, the visual alarm of the timer may cause the readout to flash on and off, alerting the students of five minutes remaining. When the time has completely expired, an audible alarm, such as a "beep" may be sounded, alerting the students and the presenter that time has expired. The audible alarm may persist until it is shut off by the presenter, or may shut off after a certain time period, five seconds for example. Visual and audio alarms may be set to activate at any time period determined by the presenter.

In another embodiment, the time tracking device may be connected to the power circuitry of the projector alone, or in combination with the solar panels, or a battery, such that the time tracking device is capable of cutting the power supply to the illumination device in the projector. In such an embodiment, the time tracking device could turn the power off to the illumination device in the projector after a predetermined time so that the moderator is not the 'bad guy' and the machine is.

Figure 3:
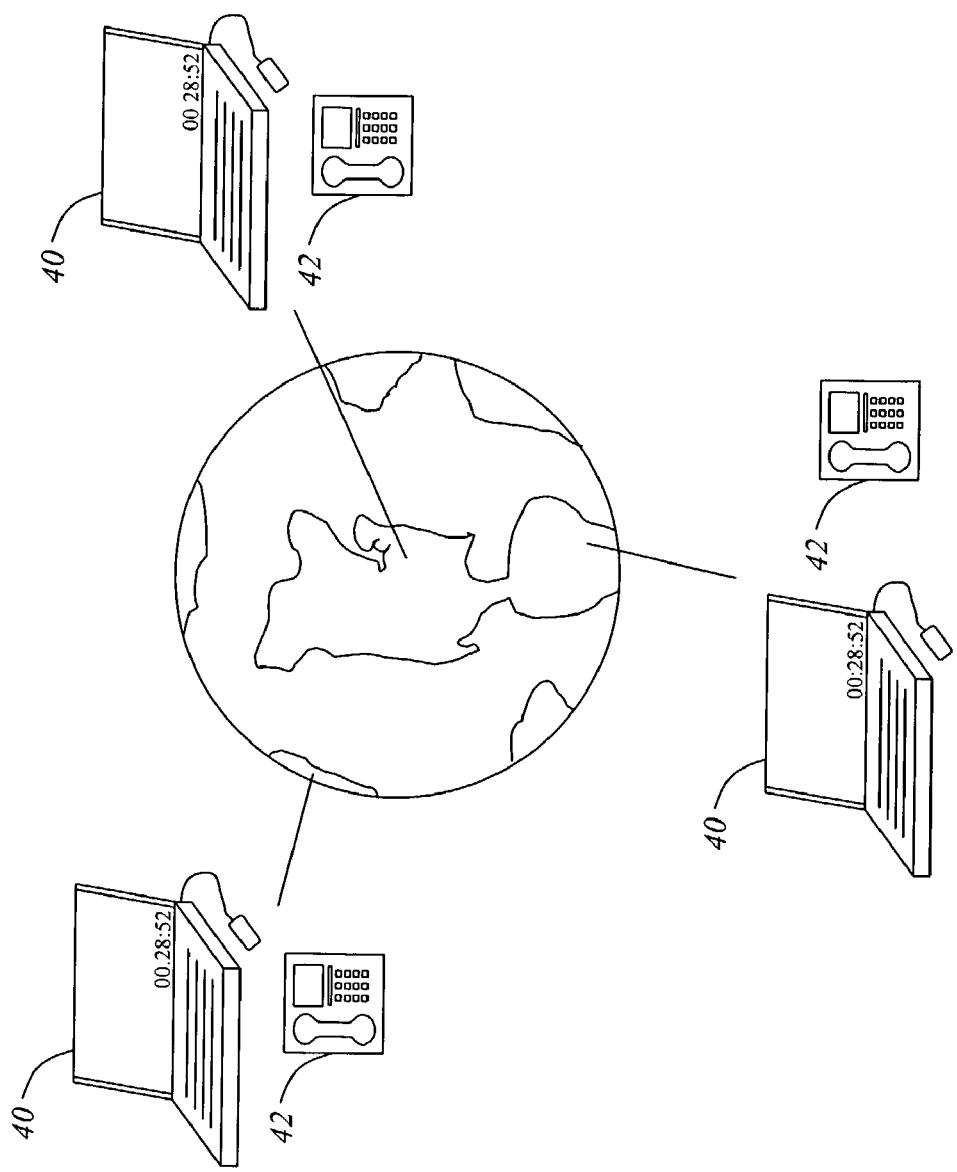
FIG. 3 is a diagram illustrating a video conferencing set-up including a time tracking device incorporated into presentation software in accordance with an exemplary embodiment of the present invention.

In an additional embodiment, the time tracking device 10 of the present invention may be incorporated into presentation software, such as in a video conferencing application. A computer may be connected to a display monitor. There may be up to n number of conference participants included in a video conference, where n is a number larger than two, that may visually and aurally communicate with one another. A typical video conferencing set-up is illustrated in FIG. 3 and includes a plurality of terminals. In one example, a plurality of monitors 40 linked together over a network enable conference participants to view video footage of other participants. Telephones 42 connected together, for example over a public switched telephone network (PSTN), may be used to provide participants with an audio connection. Each conference participant is able to view the conference from his/her own terminal, with the terminals being located anywhere in the world. The time tracking device 10 may be incorporated into the conference presentation software so that the timer readout is displayed onto each participant's terminal.

Timer function control may be handled by the leader of the conference or by any other participant. Timer functions may be performed using an input device, such as a keyboard, mouse, remote control unit, or like device. There are many possible programming variations of the time tracking device including the positioning of the display on the monitors, display size, and all of the timer functions discussed above.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than by the preceding description, and all variations and equivalents which fall within the range of the claims are intended to be embraced therein.

What is claimed is:

1. A time tracking device comprising:
  a time display device incorporated into a portion of the light stage of a projector, the light stage positioned in a housing surface of the projector and including usable space for the displaying of images, wherein the time display device displays a readout, and wherein the readout of the time display device is capable of being projected by the projector;
  a control pad incorporated into a housing of the projector, wherein the control pad controls the readout and the functions of the time tracking device; and
  a power source, wherein the power source supplies power to the control pad and display device.

2. The time tracking device of claim 1, wherein the control pad comprises one or more feature keys comprising at least one of the following: power on, power off, start timer, stop timer, pause timer, reset timer, timer mode, display on, display off, and control pad illumination.

3. The time tracking device of claim 1, wherein the display device comprises an analog timer readout display.

4. The time tracking device of claim 1, wherein the display comprises a digital timer readout display.

5. The time tracking device of claim 1, wherein the power source comprises at least one of the following: a plurality of solar panels, a battery, a connection of the time tracking device to the circuitry of the projector, and any combination of the solar panels, battery, and circuitry.

6. The time tracking device of claim 1, wherein the projector comprises at least one of the following; an overhead projector, a slide projector, a projector connected to a computer, and any other projector capable of displaying information onto a screen using a light source and a lens.

7. The time tracking device of claim 1, further comprising:
  an audible alarm, wherein the audible alarm may be programmed to sound at any predetermined time period or interval.

8. The time tracking device of claim 1, further comprising:
  a visual alarm, wherein the visual alarm alerts a presenter and the audience at a predetermined time selected by the presenter.

9. The time tracking device of claim 1, wherein the projector further comprises a remote control unit and a second control pad incorporated into the remote control unit, wherein the second control pad controls the readout and the functions of the time tracking device.

10. The time tracking device of claim 1, wherein the power source is connected to the power circuitry of the projector, such that the time tracking device is capable of cutting the power supply to an illumination device in the projector.

11. A time tracking device comprising:
a time display device incorporated into a portion of a light stage of an overhead projector, the light stage positioned in a housing surface of the projector and including usable space for the displaying of images, wherein the time display device displays a readout, wherein the readout of the time display device is capable of being projected by a light source from within a housing of the projector, and wherein the light source emits light that directly passes through the time display device;
a control pad incorporated into a housing of the projector, wherein the control pad controls the readout and the functions of the time tracking device; and
a power source, wherein the power source supplies power to the control pad and display device.

12. The time tracking device of claim 11, wherein the control pad comprises one or more feature keys comprising at least one of the following: power on, power off, start timer, stop timer, pause timer, reset timer, timer mode, display on, display off, and control pad illumination.

13. The time tracking device of claim 11, further comprising:
an audible alarm, wherein the audible alarm may be programmed to sound at any predetermined time period or interval.

14. The time tracking device of claim 11, further comprising:
a visual alarm, wherein the visual alarm alerts a presenter and the audience at a predetermined time selected by the presenter.

15. The time tracking device of claim 11, wherein the projector further comprises a remote control unit and a second control pad incorporated into the remote control unit, wherein the second control pad controls the readout and the functions of the time tracking device.

16. An overhead projector incorporating a time tracking device comprising:
a housing surface, wherein the housing surface comprises a light stage for the displaying of images;
a time display device incorporated into the portion of a light stage of the overhead projector, wherein the time display device displays a readout, wherein the readout of the time display device is capable of being projected by a light source from within a housing of the projector, and wherein the light source emits light that directly passes through the time display device;
a control pad incorporated into a housing of the projector, wherein the control pad controls the readout and the functions of the time tracking device; and
a power source, wherein the power source supplies power to the control pad and display device.

17. The overhead projector of claim 16, wherein the readout is capable of being read by a presenter viewing the housing.

18. The overhead projector of claim 16, wherein the displaying of images comprises utilizing transparencies.

* * * * *